United States Patent
Bourazak et al.

(10) Patent No.: US 7,338,598 B1
(45) Date of Patent: *Mar. 4, 2008

(54) FLUID TREATMENT SYSTEM

(75) Inventors: Jamel Bourazak, Peoria, IL (US); Larry Coleman, Peoria, IL (US)

(73) Assignee: Elm Technologies, L.L.C., Peoria, IL (US)

( * ) Notice: Subject to any disclaimer, the term of this patent is extended or adjusted under 35 U.S.C. 154(b) by 200 days.

This patent is subject to a terminal disclaimer.

(21) Appl. No.: 10/987,076

(22) Filed: Nov. 12, 2004

Related U.S. Application Data

(63) Continuation-in-part of application No. 10/321,189, filed on Dec. 17, 2002, now Pat. No. 6,875,347.

(51) Int. Cl.
*C02F 1/48* (2006.01)

(52) U.S. Cl. .................... 210/198.1; 210/243; 204/660; 422/186.04

(58) Field of Classification Search ............. 210/198.1, 210/205, 243, 702, 748; 422/186.04; 205/742; 204/660
See application file for complete search history.

(56) References Cited

U.S. PATENT DOCUMENTS

| | | | | |
|---|---|---|---|---|
| 3,926,771 A | * | 12/1975 | Lieb et al. .................. 204/268 |
| 3,975,247 A | * | 8/1976 | Stralser ...................... 205/701 |
| 4,006,067 A | * | 2/1977 | Gussack ...................... 205/746 |
| 4,654,071 A | * | 3/1987 | Muller ........................ 205/688 |
| 5,372,690 A | * | 12/1994 | Gardner-Clayson et al. .......................... 204/255 |
| 5,587,057 A | * | 12/1996 | Metzler et al. ........... 204/228.6 |
| 5,779,912 A | * | 7/1998 | Gonzalez-Martin et al. 210/748 |
| 6,141,905 A | * | 11/2000 | Rozental et al. ......... 47/58.1 R |
| 6,325,944 B1 | * | 12/2001 | DeSanto ...................... 210/748 |
| 6,328,875 B1 | * | 12/2001 | Zappi et al. ................. 205/500 |
| 6,875,347 B2 | * | 4/2005 | Bourazak et al. ........ 210/198.1 |
| 2002/0070178 A1 | * | 6/2002 | Steffens et al. ............. 210/748 |
| 2003/0155310 A1 | * | 8/2003 | Nilsen et al. ................ 210/748 |

FOREIGN PATENT DOCUMENTS

JP 62-102891 A * 5/1987
JP 10-118390 A * 5/1998

* cited by examiner

*Primary Examiner*—Frank M. Lawrence
(74) *Attorney, Agent, or Firm*—Golden's M&I; James B. Golden

(57) ABSTRACT

A fluid treatment system for reducing odor, bacteria, and biological oxygen demand from a fluid having at least one tube, a control box, and a pump. The at least one tube has a plurality of conductors in electrical communication with the control box. The control box controls the level of electrical communication to the plurality of conductors and the flow rate of the pump. The principle use is for biomass material derived from animals, however other fluids will benefit from this invention. For example, fluids derived from plants and humans as well as industrial and commercial applications will benefit from this application.

5 Claims, 6 Drawing Sheets

FLUID TREATMENT SYSTEM

CROSS REFERENCE

This application in a continuation-in-part and claims the benefit of the regular U.S. patent application Ser. No. 10/321,189 filed Dec. 17, 2002 now U.S. Pat. No. 6,875,347.

TECHNICAL FIELD

This invention relates generally to a fluid treatment system and more particularly to a fluid treatment system having at least one tube adapted to conduct electrical current through the fluid.

BACKGROUND ART

Fluid treatment systems are constantly being modified to provide a more environmentally friendly byproduct. Providing an environmentally friendly byproduct often subjects the fluid treatment system to increased wear, complexity, and maintenance. It is for that reason that emphasis has been placed over the past several years on new and economical designs for manufacturing a fluid treatment system capable of withstanding wear, complexity, and maintenance.

Various fluid treatment systems have been developed in an attempt to improve the byproduct. For example, U.S. Pat. No. 6,141,905 to Rozental discloses a fluid treatment system that supposedly provides a single reactor with a number of electrode configurations capable of providing an environmentally friendly byproduct. However, the reactor disclosed requires close proximity of electrodes in the stream of the fluid treatment system. Due to the level of electric current required for reduction of constituents leads to an increase in the temperature of the waste stream. Due to the increased temperature experienced during operation, the electrodes are subjected to increase wear and maintenance.

Another problem inherent with the fluid treatment systems is premature corrosion of electrodes. It has been found that applying electric current, during operation, provides a reaction between the waste stream and electrodes causing wear to the electrodes. The wear varies widely between electrodes causing control of the fluid treatment system to be reduced. To have the fluid treatment system operates efficiently and satisfactory from the point of view of having an environmentally friendly byproduct, it is desirable to maintain a degree of uniformity and consistency between electrodes.

Yet another problem, control of the fluid treatment system is crucial for efficient operation. Operation of the fluid treatment system changes over time due to wear of components. It is desirable to maintain consistent operation between electrodes, especially through the life of the system.

Yet another problem, flexibility of the fluid treatment system is becoming increasingly important. Having a fluid treatment system with a predetermined capacity limits owners to specific operating criteria. Because of the desire to adjust capacity of fluid treatment systems, it has made it desirable to add additional reaction tubes or remove unneeded reaction tubes. That is, the fluid treatment system is optimized as the demand changes.

The present invention is directed to overcoming one or more of the problems set forth above.

DISCLOSURE OF THE INVENTION

In one aspect of the present invention, a fluid treatment system includes a power source. At least one tube has an inlet and an outlet. The tube is in electrical communication with the power source. A fluid has a first magnitude of odor passing through the inlet. The fluid has a conductive characteristic enabling electrical current to pass through the fluid when passed through the tube. The fluid has a second magnitude of odor passing through the outlet and the second magnitude of odor is less in magnitude than the first magnitude of odor.

In another aspect of the present invention, a control system is adapted for use with a fluid treatment system which includes a power source. At least one tube is in electrical communication with the power source. A pump adapted to communicate a fluid through the tube. The fluid has a conductive characteristic enabling electrical current to pass through the fluid when passed through the tube. The pump has a first predetermined flow rate. A control box has at least one first device adapted to measure a magnitude of electrical current. At least one second device adapted to vary the magnitude of electrical current. At least one third device adapted to vary said first predetermined flow rate based on the magnitude of electrical current.

In yet another aspect of the present invention, a tube is adapted for use with a fluid treatment system which includes a inner shell having a first bore defined by a curvilinear surface and a longitudinal axis. A plurality of conductors each having a first surface and a connection bore. The plurality of conductors being disposed in the inner shell and being generally in engagement with the first bore. A plurality of insulation members each having a pair of end portions and an intermediate portion and are disposed in the inner shell and generally in engagement with the first bore. The intermediate portion defines a second surface. One of the pair of end portions is in mating engagement with the connection portion of one of the plurality of conductors. Another of the pair of end portions is in mating engagement with the connection portion of another of the plurality of conductors. A channel has a pair of side walls formed by the first surface, the second surface, and a pair of arcuate portions of the first bore. The channel is adapted to pass the fluid through the inner shell.

In yet another aspect of the present invention, a biomass treatment system includes at least one tube having an inlet, an outlet. A first bore is defined by a curvilinear surface and a longitudinal axis. A waste stream is communicated from a waste source to the inlet of at least one tube. A plurality of conductors each has a first surface and a connection bore. The plurality of conductors is disposed in the inner shell and being generally in engagement with the first bore. A plurality of insulation members each have a pair of end portions and an intermediate portion and are disposed in the inner shell and generally in engagement with the first bore. The intermediate portion defines a second surface. One of the pair of end portions is in mating engagement with the connection portion of one of the plurality of conductors. Another of the pair of end portions is in mating engagement with the connection portion of another of the plurality of conductors. A channel has a pair of side walls formed by the first surface, the second surface, and a pair of arcuate portions of the first bore. The channel is adapted to pass the fluid through the inner shell. A pump adapted to communicate the waste stream over at least a portion of the plurality of conductors. The waste stream has a conductive characteristic which enables electrical communication between a pair of the plurality of conductors. The pump has a first predetermined flow rate. A control box has an amp meter adapted to measure a magnitude of electrical current at the pair of plurality of conductors. At least one phase controller adapted to vary the magnitude of electrical current. At least one pump controller adapted to vary the first predetermined flow rate based on the magnitude of electrical current.

In yet another aspect, a method for treating a biomass waste stream has at least one tube having an inlet and an outlet. A plurality of conductors is disposed in the at least one tube. A power source adapted to provide electrical current to at least one of the plurality of conductors. The method comprises the steps of collecting the waste stream. Passing the waste stream into the inlet of the at least one tube. Providing electrical current from the power source to at least one of the plurality of conductors. Conducting the electrical current from one of the plurality of conductors through the waste stream to another one of the plurality of conductors. Passing the waste stream from the outlet of the at least one tube.

In yet another aspect of the present invention, a method of controlling a biomass waste stream has a pre-determined flow rate. At least one tube has an inlet and an outlet. A plurality of conductors is disposed in the at least one tube. A power source adapted to provide a pre-determined magnitude of electrical current to at least one of the plurality of conductors. A control box adapted to measure a second magnitude of electrical current between at least one pair of the plurality of conductors and provide a third magnitude of electrical current to at least one of the plurality of conductors. The method comprises the steps of collecting the waste stream. Passing the waste stream at a pre-determined flow rate into the inlet of the at least one tube. Measuring the second magnitude of electrical current between at least one pair of the plurality of conductors. Comparing the second magnitude of electrical current with the pre-determined magnitude of electrical current. Providing the third magnitude of electrical current to at least one of the plurality of conductors to generally equalize the second magnitude of electrical current with the pre-determined magnitude of electrical current. Passing the waste stream from the outlet of the at least one tube.

In yet another aspect of the present invention, a fluid treatment system comprises a power source. At least one tube has an inlet and an outlet. The tube is in electrical communication with the power source. A fluid has a first oxidation-reduction state passing through the inlet. The fluid has a conductive characteristic enabling electrical current to pass through the fluid when passed through the tube. The fluid has a second oxidation-reduction state passing through the outlet. The second oxidation-reduction state is different from the first oxidation-reduction state.

In yet another aspect of the present invention, a method of treating a fluid has at least one tube. The at least one tube has an inlet and an outlet. A plurality of conductors are disposed in the at least one tube. A power source is adapted to provide electrical current to at least one of the plurality of conductors. The method comprises the steps of passing the fluid into the inlet of the at least one tube. Provide electrical current from the power source to at least one of the plurality of conductors. Conduct the electrical current from one of the plurality of conductors through the fluid to another of the plurality of conductors. Separate the solids from the fluid. Pass the fluid from the outlet of the at least on tube.

In yet another aspect of the present invention, a method of cleaning a fluid treatment system has at least one tube. The at least one tube has an inlet and an outlet. A plurality of conductors are disposed in the at least one tube. A power source is adapted to provide electrical current to at least one of the plurality of conductors. The method comprises the steps of passing the fluid into the inlet of the at least one tube. Provide electrical current from the power source to at least one of the plurality of conductors. Conduct the electrical current from at least one of the plurality of conductors through the fluid to at least another one of the plurality of conductors. Switch the electrical current from the power source from the at least one of the plurality of conductors to the at least another one of the plurality of conductors. Conduct the electrical current from the at least another one of the plurality of conductors through the fluid to the at least one of the plurality of conductors.

BEST MODE FOR CARRYING OUT THE INVENTION

Figure 1:
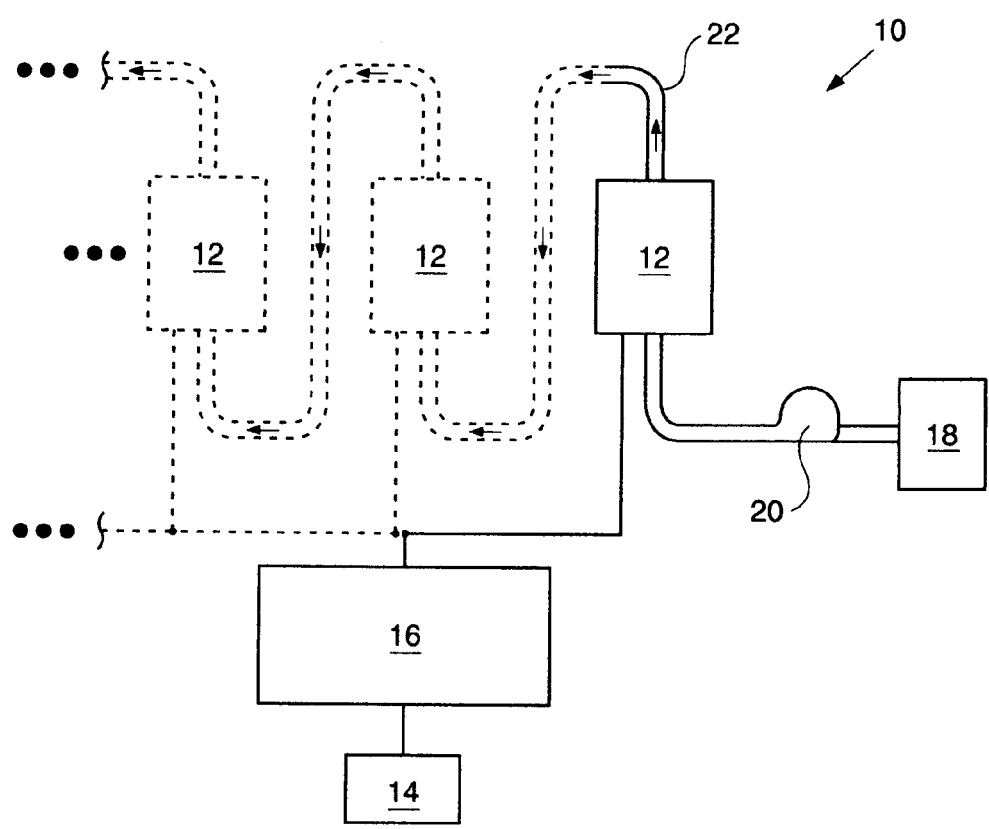
FIG. 1 is a schematic representation of a fluid treatment system embodying the present invention.

Turning to the drawings and particularly to FIG. 1 a schematic representation of a fluid treatment system (10) is shown with one embodiment of the present invention. As seen therein, the fluid treatment system (10) includes at least one tube (12), a power source (14), a control box (16), a fluid source (18), a pump (20), and conduit (22). In the preferred embodiment, the fluid source (18) is a biomass material, typically derived from animals. However, the fluid source (18) may be made by a number of materials, such as, but not limited to, plants, humans, organic molecules and the like that are well known in the art. In another embodiment of the present invention the fluid source (18) is a chemical composition, typically derived from industrial and commercial applications. The fluid treatment system (10) is capable of treating biomass materials, organic molecules, chemical compositions, a combination thereof, and the like without departing from the spirit of the invention. Furthermore, the fluid treatment system is shown using one of the at least one tube (12). However, multiple tube (12) may be used without departing from the spirit of the invention. For example, large commercial operations may require several tube assemblies (12) to be used to match the quantity of byproduct desired. Typical installation of multiple tube (12) have tube (12) connected in series. However, fluid treatment systems (10) that are installed in parallel may be used without departing from the spirit of the invention Referring to FIG. 2, the at least one tube (12) includes an outer shell (24) and an inner shell (26). The outer shell (24) defines a shell cavity (28) disposed about and generally surrounds the inner shell (26). The outer shell (24) is typically constructed from a material, such as plastic and the like. However, the outer shell (24) may be constructed from a material, such as, steel, iron, composite, and the like without departing from the spirit of the invention. The shell cavity (28) is typically filled with an insulation material (30), such as foam and the like. Furthermore, the outer shell (24) is attached to the inner shell (26) using a pair of ring members (31). One of the pair of ring members (31) locates the outer shell at the inlet (34) and the other one of the ring members (31) locates the outer shell at the outlet (36).

However, the outer shell (24) maybe attached to the tube using adhesive, clamps, and the like that are well known in the art.

Figure 2:
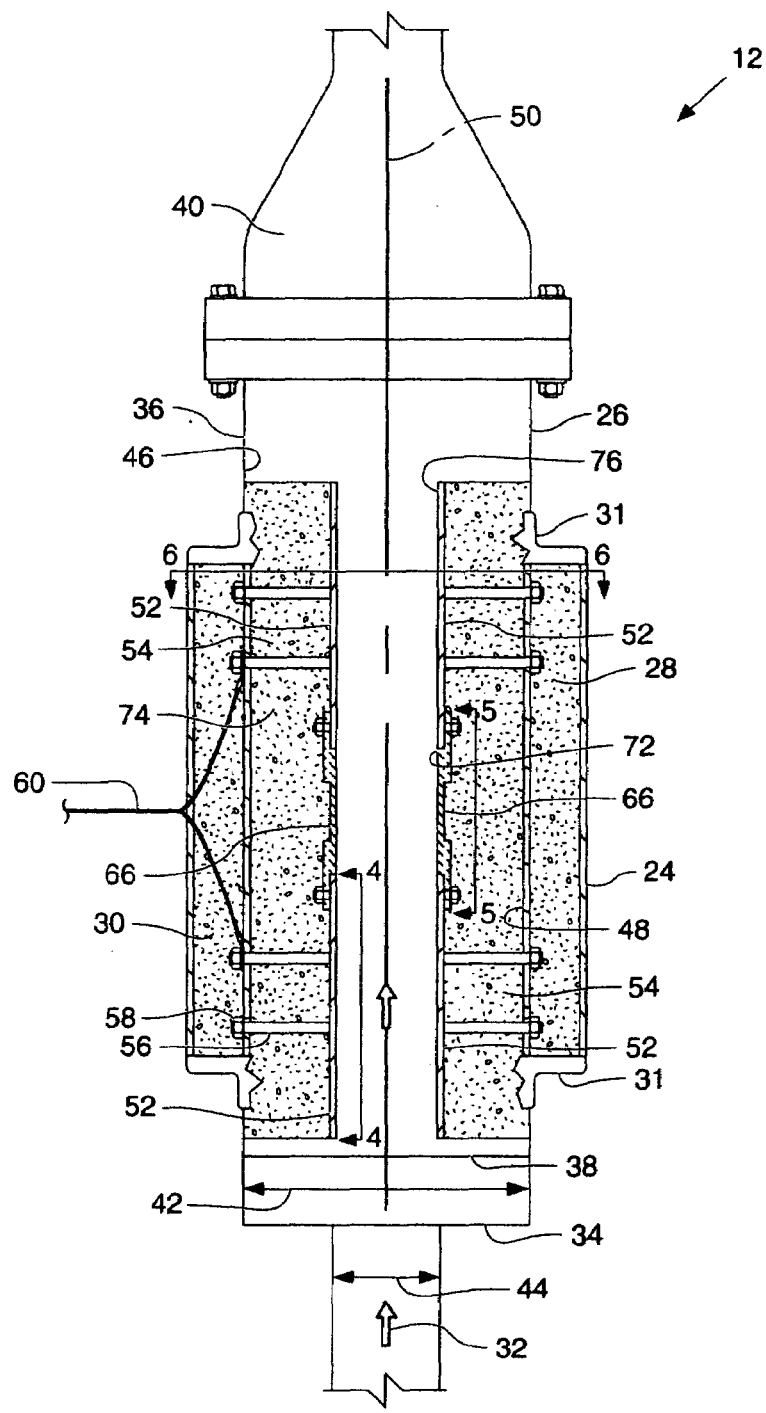
FIG. 2 is a diagrammatic partial cross-sectional view of at least one tube of FIG. 1 embodying the present invention.

The inner shell (26) as shown in FIG. 2 has an inlet (34) and outlet (36) for passing fluid (32) from the conduit (22). The inlet (34) is connected to the conduit (22) using a reducing plate (38). The reducing plate (38) allows fluid (32) from the conduit (22) to pass into the inlet (34) of the inner shell (26). The fluid (32) entering the inlet (34) has a first magnitude of odor, a first magnitude of organic molecules, and a first oxidation-reduction state. Typically odor is characteristic of the bio-mass material and/or the organic molecules, and the oxidation-reduction state is characteristic of chemical compositions from industrial or commercial applications. One should realize that applications may fall within a bio-mass material, organic molecules, as well as an oxidation-reduction state without departing from the spirit of the invention. The outlet (36) of the inner shell (26) is fastened to a reducer (40). The reducer (40) allows fluid (32) to pass from the outlet (36) of inner shell (26) into the conduit (22). The fluid (32) exiting the outlet (36) has a second magnitude of odor, a second magnitude of organic molecules, and a second oxidation-reduction state. The second magnitude of odor is generally less in magnitude than the first magnitude of odor. The second magnitude of organic molecules is generally less in magnitude than the first magnitude of organic molecules. The second oxidation-reduction state is different compared with the first oxidation-reduction state. Depending on application, it may be desirable to have a higher oxidation state to neutralize the fluid (32) from the fluid treatment system (10). For example, a mining application may lower the oxidation-reduction state to enhance production of chemical substances and neutralize the acids in the fluid (32). In another example, the oxidation-reduction state may be increased to enhance the separation of suspended solids from the fluid (32). It should be recognized that the fluid (32) may be identified by other relevant factors, such as, bacteria, fecal coliform and fecal streptococci bacteria, biological oxygen demand, nitrates, phosphates, living invertebrate organisms, sulfate-reducing microbes, hydrogen ions, solids, ions, growth hormones, antibiotics, and drug metabolites alone or in combination without departing from the spirit of the invention. For example, the fluid (32) has a first magnitude of bacteria entering the inlet (34) and a second magnitude of bacteria exiting the outlet (36). The second magnitude of bacteria is generally less in magnitude than the first magnitude of bacteria. Another example, the fluid (32) has a first magnitude of fecal coliform and fecal streptococci bacteria entering the inlet (34) and a second magnitude of fecal coliform and fecal streptococci bacteria exiting the outlet (36). The second magnitude of fecal coliform and fecal streptococci bacteria is generally less in magnitude than the first magnitude of fecal coliform and fecal streptococci bacteria. Another example, the fluid (32) has a first magnitude of biological oxygen demand entering the inlet (34) and a second magnitude of biological oxygen demand exiting the outlet (36). The second magnitude of biological oxygen demand is generally less in magnitude than the first magnitude of biological oxygen demand. Another example, the fluid (32) has a first magnitude of nitrates entering the inlet (34) and a second magnitude of nitrates exiting the outlet (36). The second magnitude of nitrates is generally less in magnitude than the first magnitude of nitrates. Another example, the fluid (32) has a first magnitude of phosphates entering the inlet (34) and a second magnitude of phosphates exiting the outlet (36). The second magnitude of phosphates is generally less in magnitude than the first magnitude of phosphates. Another example, the fluid (32) has a first magnitude of living invertebrate organisms entering the inlet (34) and a second magnitude of living invertebrate organisms exiting the outlet (36). The second magnitude of living invertebrate organisms is generally less in magnitude than the first magnitude of invertebrate organisms. Another example, the fluid (32) has a first magnitude of sulfate-reducing microbes entering the inlet (34) and a second magnitude of sulfate-reducing microbes exiting the outlet (36). The second magnitude of sulfate-reducing microbes is generally less in magnitude than the first magnitude of sulfate-reducing microbes. Another example, the fluid (32) has a first magnitude of hydrogen ions entering the inlet (34) and a second magnitude of hydrogen ions exiting the outlet (36). The second magnitude of hydrogen ions is generally less in magnitude than the first magnitude of hydrogen ions. Another example, the fluid (32) has a first magnitude of solids entering the inlet (34) and a second magnitude of solids exiting the outlet (36). The second magnitude of solids is generally greater in magnitude than the first magnitude of solids. Another example, the fluid (32) has a first magnitude of ions entering the inlet (34) and a second magnitude of ions exiting the outlet (36). The second magnitude of ions is generally greater in magnitude than the first magnitude of ions. It should be recognized that the relevant factors identifying the fluid (32) may be used in combination without departing from the spirit of the invention. For example, the fluid (32) has a first magnitude of factors characteristic of a combination of first magnitudes discussed above entering the inlet (34) and a second magnitude of factors exiting the outlet (36). The second magnitude of factors is generally less in magnitude than the first magnitude of factors. However, there may be occasions when factors, such as, ions and solids may cause the second magnitude of factors to be greater than the first magnitude of factors without departing from the spirit of the invention. Another example, the fluid (32) has a first magnitude of growth hormones entering the inlet (34) and a second magnitude of growth hormones exiting the outlet (36). The second magnitude of growth hormones is generally less in magnitude than the first magnitude of growth hormones. Another example, the fluid (32) has a first magnitude of antibiotics entering the inlet (34) and a second magnitude of antibiotics exiting the outlet (36). The second magnitude of antibiotics is generally less in magnitude than the first magnitude of antibiotics. Another example, the fluid (32) has a first magnitude of drug metabolites entering the inlet (34) and a second magnitude of metabolites exiting the outlet (36). The second magnitude of metabolites is generally less in magnitude than the first magnitude of metabolites. Another example, the fluid (32) has a first magnitude of surfactants entering the inlet (34) and a second magnitude of surfactants exiting the outlet (36). The second magnitude of surfactants is generally less in magnitude than the first magnitude of surfactants.

The reducing plate (38) and reducer (40) are sized to match a tube diameter (42) with a conduit diameter (44). Typically, the conduit diameter (44) is less in magnitude than the tube diameter (42). It should be realized that other configuration may be used without departing from the spirit of the invention. For example, the conduit diameter (44) may be equal or larger in magnitude to the tube diameter (42). The material of the reducing plate (38) and reducer (40) may be constructed of plastic, iron, steel, composite, as well as, other materials known in the art. The inner shell (26) has a first bore (46) defined by a curvilinear surface (48) and a longitudinal axis (50). The curvilinear surface (48) is typically disposed about and generally parallel to the longitudinal axis (50). However, other bore configurations may be used without departing from the spirit of the invention. For example, square surfaces, triangular surfaces, and other geometric surfaces well known in the art.

Figure 4:
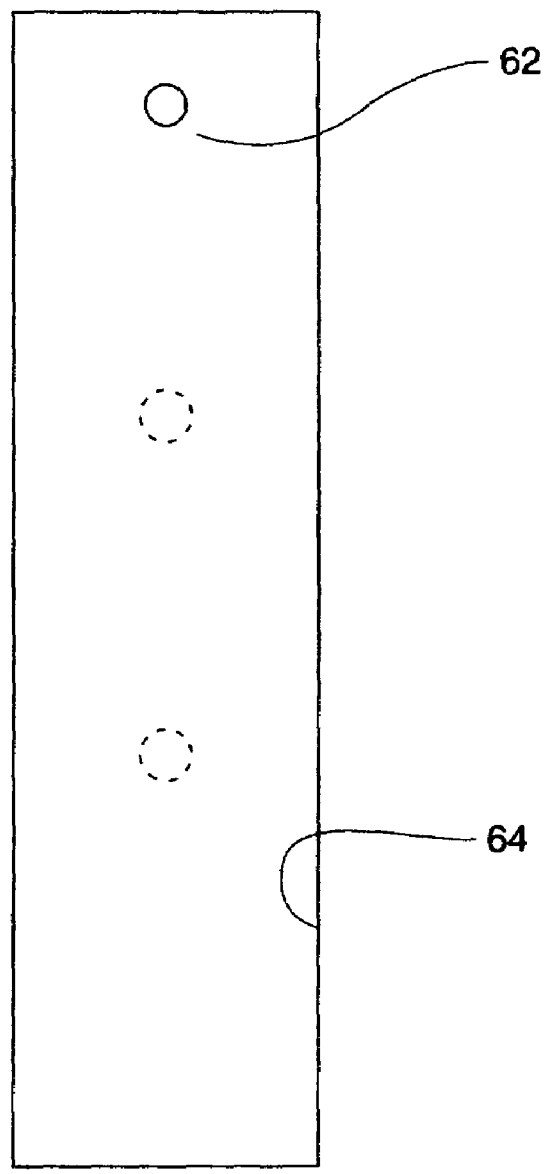
FIG. 4 is a diagrammatic partial cross-sectional view taken along lines 4-4 of FIG. 2 embodying the present invention.

Referring to FIG. 2 and FIG. 4, a plurality of conductors (52) is disposed in the inner shell (26) and in engagement with the first bore (46). A conductor cavity (54) is defined between the curvilinear surface (48) and the plurality of conductors (52). Furthermore, each of the plurality of conductors (52) is fastened to the inner shell (26) using at least one stud (56) attached to the plurality of conductors (52). The type of connection between the at least one stud (56) and the plurality of conductors (52) is well known to somebody skilled in the art. For example, the connection could be achieved by using a weld, adhesive, and the like without departing from the spirit of the invention. At least one stud (56) extends through the inner shell (26) and into the shell cavity (28) of the outer shell (24). A lock nut (58) is threaded onto at least one stud (56) providing a releasable connection between the plurality of conductors (52) and the inner shell (26). The plurality of conductors (52) are made form a steel, stainless steel, copper, cast iron, and the like without departing from the spirit of the invention. To improve wear characteristics of the plurality of conductors (52), a coating of chrome, polymer, ceramic, and the like may be applied without departing from the spirit of the invention. Another embodiment (not shown), may have support members formed with the at least one tube (12). The support members provide the structure for attaching the plurality of conductors (12) to the tube (12). The attachment of the plurality of conductors (12) is typically the same as discussed above. A wire (60) from a control box (16) is in engagement with the at least one stud (56) passing current from the control box (16) to the plurality of conductors (52). The control box (16) will be discussed in greater detail below. The plurality of conductors (52) each has a connection portion (62) and a first surface (64) which will be discussed in more detail below.

Figure 5:
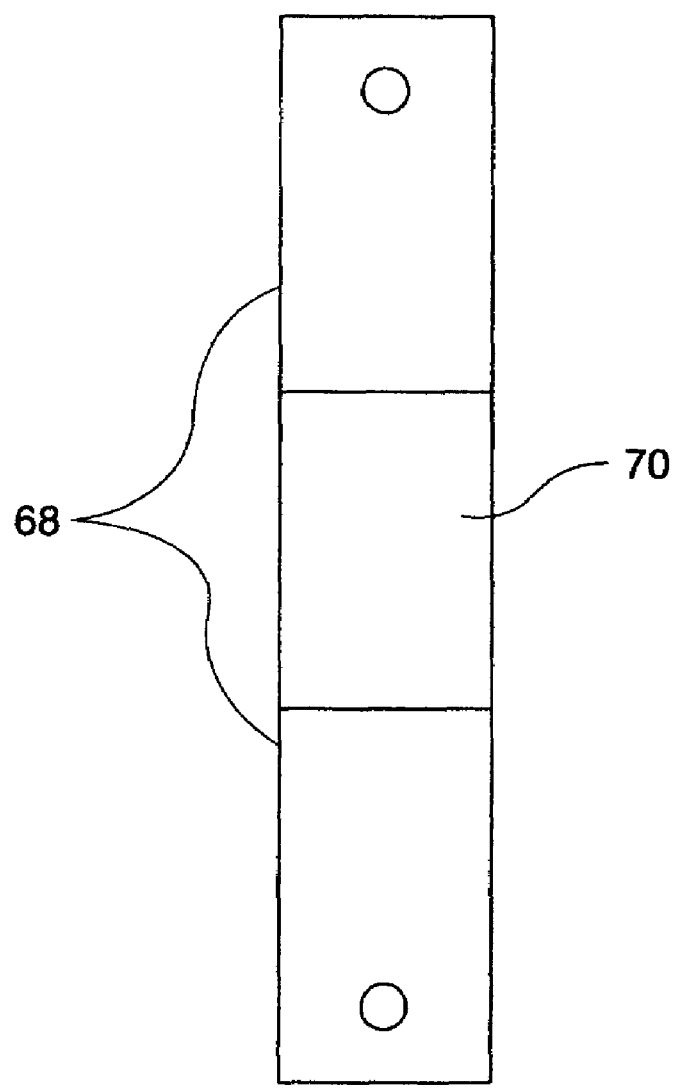
FIG. 5 is a diagrammatic partial cross-sectional view taken along lines 5-5 of FIG. 2 embodying the present invention.

Referring to FIG. 2 and FIG. 5, a plurality of insulation members (66) is disposed in the inner shell (26) and in engagement with the first bore (46). Each of the plurality of insulation members (66) has a pair of end portions (68) and an intermediate portion (70). The intermediate portion defines a second surface (72). One of the pair of end portions (68) is in mating contact with the connection portion (62) of one of the plurality of conductors (52) and the other one of the pair of end portions (68) is in mating contact with the connection portion (62) of another one of the plurality of conductors (52). The engagement between the pair of end portions (68) and the connection portion (62) generally aligns the first surface (64) of the plurality of conductors (52) with the second surface (72) of the plurality of insulation members (66). The type of connection between each of the pair of end portions (68) and the connection portion (62) of the plurality of conductors (52) is well known in the art. For example, the connection could be achieved by using a bolt, stud, rivet and the like without departing from the spirit of the invention. The plurality of insulation members are made of plastic material and the like without departing from the spirit of the invention. An insulator cavity (74) is defined between the curvilinear surface (48) and the plurality of insulation members (66). Typical applications fill the conductor cavity (54) and insulator cavity (74) with insulation, such as foam. Insulating the outer shell (24) and the conductor and insulator cavities (54, 74) minimizes the amount of condensation that occurs during operation of the fluid treatment system (10). It should be recognized, as discussed with the plurality of conductors (52, that another embodiment may have support structure formed with at least one plurality of tubes (12) without departing from the spirit of the invention. Furthermore, non-conductive materials may be used to form the support structure, such as polymers, which may allow the plurality of insulation members (66) to be integral with the at least one tube (12).

Figure 6:
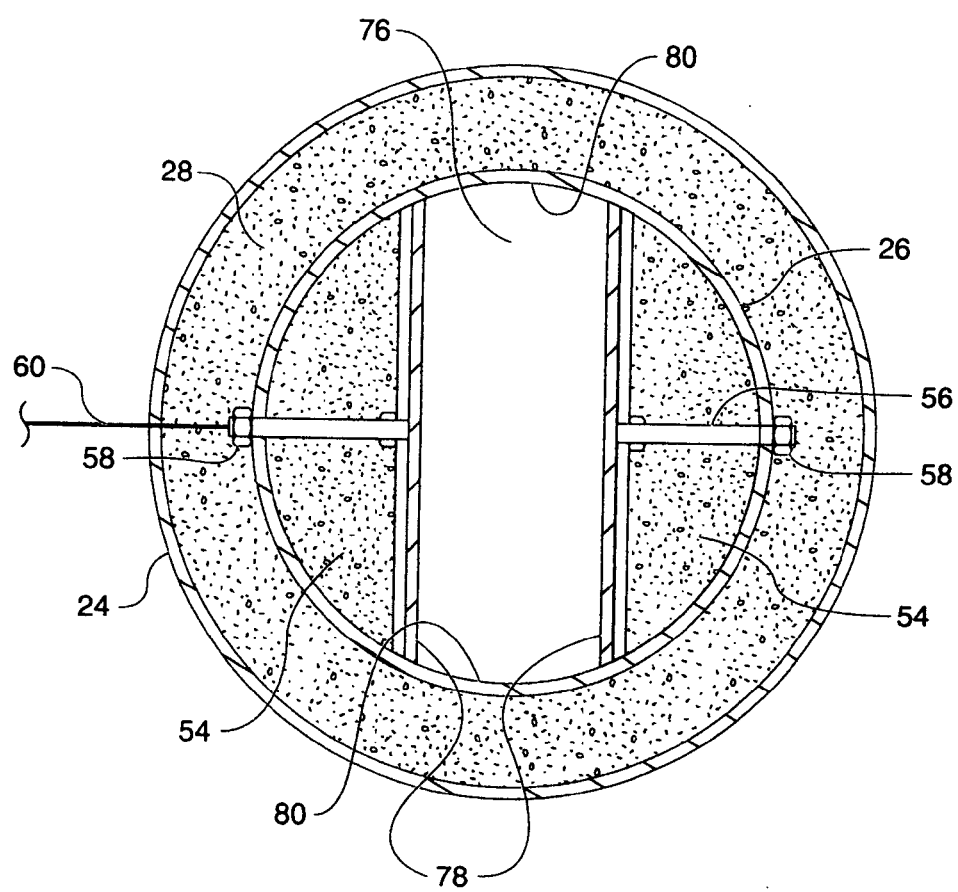
FIG. 6 is a diagrammatic partial cross-sectional view taken along lines 6-6 of FIG. 2 embodying the present invention.

The inner shell (26), as shown in FIG. 2 and FIG. 6, has a channel (76) formed therein. The channel (76) is constructed of a pair of side walls (78) formed from the first surface (64) of the plurality of conductors (52) and the second surface (72) of the plurality of insulation members (66), and a pair of arcuate portions (80) of the first bore (46). The channel (76) passes fluid (32) from the inlet (34) to the outlet (36) of the inner shell (26). The flow of fluid (32) through the channel passes over at least a portion of the plurality of conductors and insulation members (52, 66).

Referring to FIG. 1, the pump (20) provides communication from the fluid source (18) to at least one of the tube (12). The pump (20) is in electrical communication with the power source (14). The pump (20) passes the fluid through the conduit (22) at a first predetermined flow rate. It should be recognized that other pump (20) configurations may be used without departing from the spirit of the invention. For example, larger applications may require multiple pumps (20) to be disposed in the conduit (22) for providing the desired flow rate.

Figure 3:
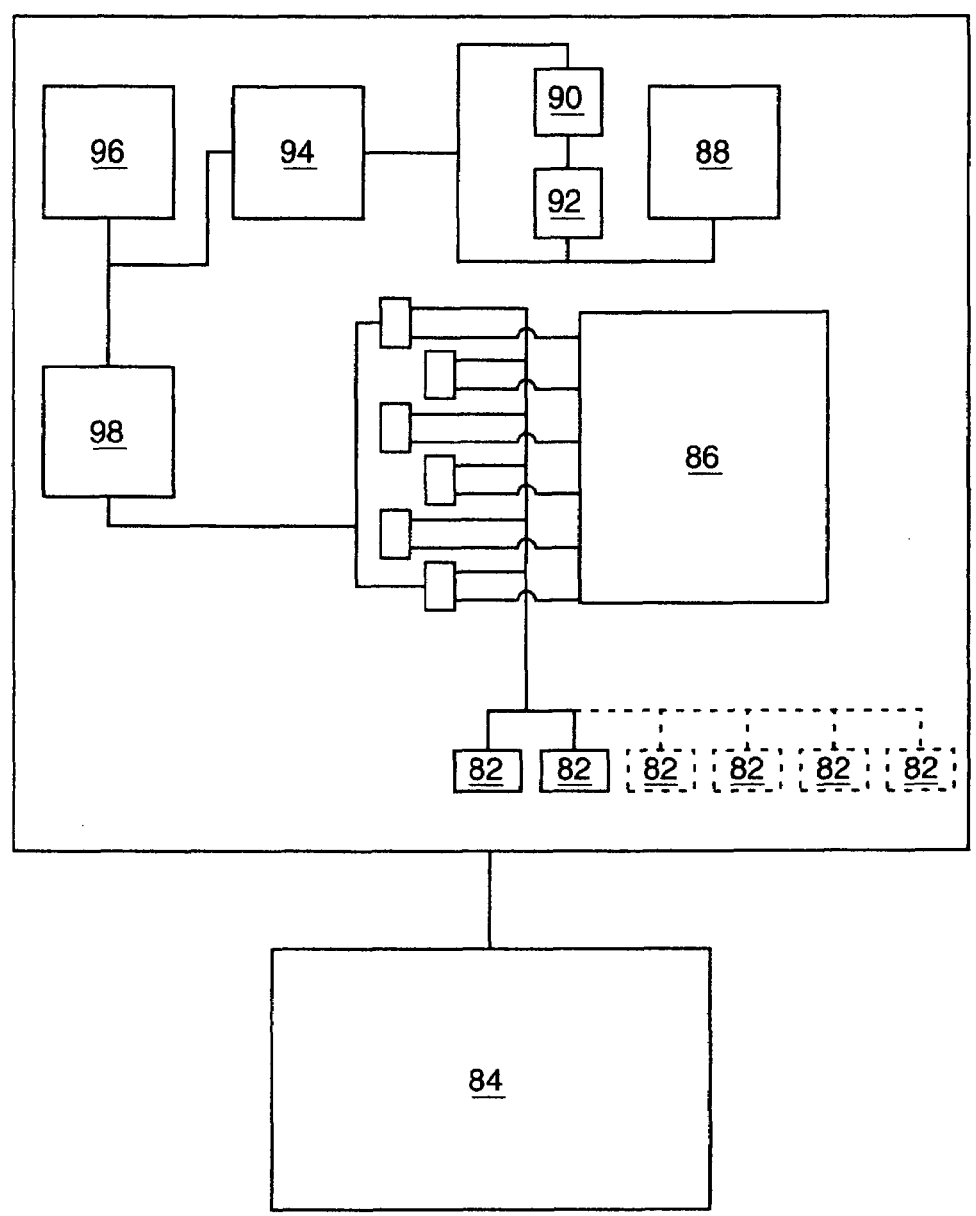
FIG. 3 is a diagrammatic partial cross-sectional view of a control box of FIG. 1 embodying the present invention.

Referring to FIG. 1 and FIG. 3, the control box (16) provides control of the pump (20) and electrical-current to the plurality of conductors (52). A first device (82) is disposed in the control box (16) and provides feedback control from the fluid treatment system (10). Typically, an amp meter (82) is used to measure a second magnitude of electrical current that is being used in the fluid treatment system (10). Based on the application of the fluid treatment system (10) a current transducer (82), in particular, a true root means square (r.m.s.) current transducer, may be used to measure the second magnitude of electrical current. It should be recognized that other devices may be used without departing from the spirit of the invention. For example, multi-meters, photo electrics, fiber optics, flow meters, and the like that are well known in the art may be used. A power source (84) typically provides a pre-determined electrical current generally between 20 volts and 1,000 volts to the plurality of conductors (52). The electrical current applied to the fluid (32) destroys organic molecules, and ruptures the cellular membranes of bacteria and living invertebrate organisms. To one skilled in the art, bacteria converts proteins into fatty acids, sulfate into hydrogen sulfide, and organic nitrogen into ammonia. The destruction of organic molecules, including fatty acids that are present in the fluid (32) reduces the odor associated with the fluid (32). The reduction of bacteria in the fluid (32) decreases the production of new fatty acids, ammonia, and hydrogen sulfide which reduces the emissions of odor and toxic gases associated with the fluid (32). The control box (16) compares the pre-determined electrical current being communicated to the plurality of conductors (52) with the second magnitude of electrical current measured with the first device (82). When a variation between the pre-determined electrical current communicated and the second measured electrical current is outside a predetermined tolerance then the control box (16) uses a second device (86) to minimize the variation in electrical current. A third magnitude of electrical current is communicated to the plurality of conductors (52). The third magnitude of electrical current is such that, the second magnitude of electrical current is generally equal to the pre-determined electrical current. The second magnitude of electrical current is characteristic of the fluid (32) being used. For example, a fluid (32) that includes animal excrement, such as a waste stream, has a predetermined conductive characteristic which typically differs from waste streams characteristic of plant waste or human waste. Furthermore, corrosion of the plurality of conductors (52) occurs at different rates based on the characteristics of the fluid (32) being used. Typically, a phase controller (86) is used to vary the third magnitude of electrical current that is communicated between the power source (82) and the plurality of conductors (52). The preferred second device (86) is a silicon controlled rectifier (86). The silicon controlled rectifier (86) is a solid state switching device which provides a fast and infinitely variable proportional control of electrical current. The silicon controlled rectifier (86) has phase angle fired controls to turn on a percentage of each wire (60) half cycle to give a smooth variable application of power, to adjust to fast load changes, to include voltage limits, soft start, and current limit. It should be recognized that other types of second device (86) may be used without departing from the spirit of the invention. For example, solid state rectifiers and the like that are well known in the art. The third magnitude of electric current is communicated to at least one of the plurality of conductors (52) for duration sufficient to bring the measured second magnitude of electrical current within desired tolerances for the fluid treatment system (10). For example, the second magnitude of electric current when measured is slightly out of tolerance for the fluid treatment system (10). In this case, the second device (86) may pulse the magnitude of third electrical current to bring the second magnitude of electrical current within desired tolerances. The amount of pulsation is characteristic of the fluid (32) and operating condition s of the fluid treatment system (10). The control box (16) may communicate a pulsating electric current to at least one of the plurality of conductors (52) which aids in mechanical separation of suspended solids from the fluid (32). For example, the third magnitude of electric current is communicated to at least on of the plurality of conductors (52) through the fluid (32) and to another one of the plurality of conductors (52). The flow of current through the fluid generally separates solids from the fluid (32). The current and the separated solids continue to flow through the fluid (32) to another one of the plurality of conductors (52). The pulsation of the electric current attracts the separated solids to at least one of the plurality of conductors (52) when electric current is present followed by removal of the separated solids from at least one of the plurality of conductors (52) when current is turned off from at least one of the plurality of conductors (52). Typically, removal of the solids from at least one of the plurality of conductors is achieved by a gravity belt seperator allowing the solids to generally slide off of at least one of the plurality of conductors (52). However, other techniques may be used without departing from the invention, such as, pretreatment of the fluid, polymer addition, centrifuge, mechanical scrubbers, velocity of the fluid (32), wheel press, and the like. The plurality of conductors (52) as mentioned previously may be coated to aid in removal of the solids from at least one of the plurality of conductors (52). Collection of the separated solids may be done with at least one tube, a combination of tubes, or after the fluid (32) exited the fluid treatment system (10). Usage, environment, and fluid characteristics may require the plurality of conductors (52) to be cleaned. The control box (16) may change the polarity between one of the plurality of conductors (52) with another one of the conductors (52). The change in polarity reverses the current flow through the fluid and thus the separated solids are attracted to a different one of the plurality of conductors (52). The change in polarity cleanses the previous one of the plurality of conductors (52) with the fluid (32) flowing through the fluid treatment system (10). However, other devices, such as, a cleanser may be used to cleanse at least one of the plurality of conductors (52) without departing from the spirit of the invention. The control box (16) may have a set of relays corresponding to the plurality of conductors (52) being used with the fluid treatment system (10). The relays are in electrical communication with the plurality of conductors (52) and capable of switching polarity from one of the plurality of conductors to another one of the plurality of conductors (52). In some instances, the fluid treatment system may reach operational limits which may require the control box (16) to use a third device (88) to minimize the variation between the electrical current communicated to the plurality of conductors and the magnitude of electrical current measured by the first device (82). The third device, such as, a pump controller (88) varies the flow rate provided by the pump to compensate for the variation discussed above. The third device (88) provides a flow rate generally between 25 gallons per minute and 40 gallons per minute. The ability of controlling the electrical current and flow rate of the fluid (34) provides consistent operation of the fluid treatment system (10). Furthermore, the control box (16) is at least partially air-conditioned to provide long life for components, such as, the first, second, and third devices (82, 86, 88) that are disposed in the control box (16). However, it should be recognized that, the control box (16) without air-conditioning would not depart from the spirit of the invention. Control box (16) components, such as, a fuse block (90), a starter (92), a transformer (94), a breaker (96), a contactor (98), and the like may be used with the fluid treatment system (10) without departing from the spirit of the invention.

INDUSTRIAL APPLICABILITY

With reference to the Figs. and in operation, reduction of odor, bacteria, biological oxygen demand, and other concentrations of constituents, i.e. fecal coliform and fecal streptococci bacteria, nitrates, phosphates, living invertebrate organisms, sulfate-reducing microbes, hydrogen ions, solids, ions, growth hormones, antibiotics, drug metabolites and the like are reduced by using the fluid treatment system (10). Fluid (32) is passed through the conduit (22) to one of the at least one tube (12). The fluid (32) is pumped from the fluid source (18), such as animal excrement from a hog farm, industrial waste, or commercial waste to the at least one tube (12). The fluid (32) passes through the tube where an electrical current is communicated to the plurality of conductors (52). The fluid (32) passing through the at least one tube (32) conducts the electrical current from one of the plurality of conductors (52) to another of the plurality of conductors (52). It is this electrical current being conducted through the fluid (32) that reduces the concentration of constituents. In some applications, suspended solids are in the fluid (32) and the electrical current generally separates the solids in the fluid which in turn generally increase the solids, ions, and the like. In applications that include multiple tube assemblies (12), the fluid is then passed through conduit to the next at least one tube (12). The operation of conducting the electrical current through the liquid typically increases the temperature of the fluid (32). The conduit between tube assemblies (12) allows the fluid to decrease in temperature. Thus, allowing the fluid to cool between tube assemblies (12) which improve the overall operation, and life of the plurality of conductors (52) in the fluid treatment system (10). The control box (16) provides uniformity and consistency between the plurality of electrodes (52). The control box (16) the first device (82) measures the magnitude of electric current utilized during operation. The control box (16) compares the magnitude of electrical current with what was communicated from the power source (14) to the plurality of conductors (52). The control box (16) utilizes the second device (86) to vary the magnitude of electrical current communicated to the plurality of conductors (52). The ability to vary the magnitude and duration of electrical current that is conducted through the fluid (32) enhances the operation of the fluid treatment system (10). Further enhancing the fluid treatment system (10), the control box (16), utilizes the third device (88) to control the flow rate of the fluid (32) passing through the inner shell (26). The capability of controlling the pump (20), i.e. flow rate, allows the fluid (32) to pass over at least a portion of the plurality of conductors (52) at a rate that corresponds to the fluid (32) level of conductivity.

A method of treating the biomass waste stream, i.e. animal excrement and the like. Collect the waste stream (32) and pass the waste stream (32) into the inlet (34) of at least one tube (12). Provide electrical current from the power source (14) to at least one of said plurality of conductors (52). Conduct electrical current from one of the plurality of conductors (52) through the waste stream (32) to another of said plurality of conductors (52). Pass the waste stream from the outlet of at least one tube (12).

A method of controlling the biomass waste stream (32), i.e. animal excrement and the like. Collect the waste stream (32). Pass the waste stream (32) at the pre-determined flow rate into the inlet (34) of the at least one tube (12). Measure the second magnitude of electrical current between at least one pair of the plurality of conductors (52).

Compare the second magnitude of electrical current with the pre-determined magnitude of electrical current. Provide the third magnitude of electrical current to at least one of the plurality of conductors (52) to generally equalize the second magnitude of electrical current with the pre-determined magnitude of electrical current. Pass the waste stream from the outlet of the at least one tube (12).

A method of treating a fluid (32) with suspended solids is achieved by passing the fluid (32) into the inlet (34) of at least one tube (12). The control box (16) provides electrical current from the power source (14) to at least one of the plurality of conductors (52). The electrical current is conducted from one of the plurality of conductors (52) through the fluid (32) to another of the plurality of conductors (52). The flow of electric current through the fluid (32) separates the solids from the fluid (32). The fluid is passed from the outlet of the at least on tube.

A method of cleaning a fluid treatment system (10) with at least one tube (12). The fluid is passed into the inlet of at least one tube. The control box (16) provides electrical current from the power source (14) to at least one of the plurality of conductors (52). The electrical current is conducted from at least one of the plurality of conductors (52) through the fluid (32) to at least another of the plurality of conductors (52). The electrical current from said power source (16) is switched from at least one of the plurality of conductors (52) to at least another one of the plurality of conductors. The electrical current conducted from at least another one of the plurality of conductors (52) through the fluid (32) to at least one of the plurality of conductors (52)

Fluid treatment systems (10) that utilize at least one tube (12) have improved operation. The improved operation reduces the bacteria which results in diminished production of ammonia and hydrogen sulfide within the fluid treatment system (10) and the surrounding area. The improved operation further diminishes the incidence and transmission of animal disease. Lesser production of these toxic gases results in improved air quality for animals and workers within the surrounding area. Furthermore, the emissions of odors, ammonia, and hydrogen sulfide to the environment are also decreased from the use of this invention. The plurality of conductors (52) as discussed above provides a longer life with less service time. The ability for owners to utilize the quantity of tube assemblies (12) desired allows for efficient and economical operation of the fluid treatment system (10). The degree of control in electrical communication and flow rate provide a uniform and consistent operation which reduces wear of the plurality of conductors (52). Furthermore, fluid treatment systems (10), as discussed above allows for less complex orientations of the plurality of conductors (52) within the inner shell (26) which enhances operation, durability, and maintenance.

Other aspects, objects and advantages of this invention can be obtained from a study of the drawings, the disclosure and the appended claims.

What is claimed is:

1. A fluid treatment system, comprising:
   a power source;
   at least one tube having an inlet and an outlet, and a channel being generally disposed between said inlet and said outlet, said channel being defined by a plurality of conductors each being solid, and an inner shell, said plurality of conductors being in electrical communication with said power source, and said power source communicating a pre-determined electrical current to said plurality of conductors; and
   a fluid having a first magnitude of organic molecules passing through said inlet, said fluid having a conductive characteristic enabling electrical current to pass through said fluid when passed through said tube, said electrical current passing through said fluid being measured, said measured current having a second magnitude of electrical current, said pre-determined electrical current and said second magnitude of electrical current being compared, said power source communicating a third magnitude of electrical current when said second magnitude of electrical current being unequal with said predetermined electrical current, said third magnitude of electrical current generally maintains said pre-determined electrical current between said plurality of conductors, and said fluid having a second magnitude of organic molecules passing through said outlet and said second magnitude of organic molecules being less in magnitude than said first magnitude of organic molecules.

2. The fluid treatment system, as set forth in claim 1, wherein said fluid having a first magnitude of growth hormones passing through said inlet, said fluid having a second magnitude of growth hormones passing through said outlet and said second magnitude of growth hormones being less in magnitude than said first magnitude of growth hormones.

3. The fluid treatment system, as set forth in claim 1, wherein said fluid having a first magnitude of antibiotics passing through said inlet, said fluid having a second magnitude of antibiotics passing through said outlet and said second magnitude of antibiotics being less in magnitude than said first magnitude of antibiotics.

4. The fluid treatment system, as set forth in claim 1, wherein said fluid having a first magnitude of drug metabolites passing through said inlet, said fluid having a second magnitude of drug metabolites passing through said outlet and said second magnitude of drug metabolites being less in magnitude than said first magnitude of drug metabolites.

5. The fluid treatment system, as set forth in claim 1, wherein said fluid having a first magnitude of surfactants passing through said inlet, said fluid having a second magnitude of surfactants passing through said outlet and said second magnitude of surfactants being less in magnitude than said first magnitude of surfactants.

* * * * *